(12) United States Patent
Mun

(10) Patent No.: US 12,389,272 B2
(45) Date of Patent: Aug. 12, 2025

(54) METHOD AND APPARATUS FOR DETERMINING A PATH OF AN AUTONOMOUS DRIVING VEHICLE CONSIDERING COMMUNICATION NETWORK LOAD

(71) Applicant: Industry-Academic Cooperation Foundation, KOREA NATIONAL UNIVERSITY OF TRANSPORTATION, Chungju-si (KR)

(72) Inventor: Cheol Mun, Yongin-si (KR)

(73) Assignee: Industry-Academic Cooperation Foundation, KOREA NATIONAL UNIVERSITY OF TRANSPORTATION, Chungju-si (KR)

( * ) Notice: Subject to any disclaimer, the term of this patent is extended or adjusted under 35 U.S.C. 154(b) by 251 days.

(21) Appl. No.: 17/993,930

(22) Filed: Nov. 24, 2022

(65) Prior Publication Data

US 2024/0140474 A1 May 2, 2024

(30) Foreign Application Priority Data

Oct. 31, 2022 (KR) .................. 10-2022-0143009

(51) Int. Cl.
*H04W 28/08* (2023.01)
*B60W 60/00* (2020.01)
(52) U.S. Cl.
CPC .......... *H04W 28/08* (2013.01); *B60W 60/001* (2020.02); *B60W 2556/45* (2020.02)

(58) Field of Classification Search
CPC . H04W 28/08; B60W 60/001; B60W 2556/45
USPC ......................................................... 701/24
See application file for complete search history.

(56) References Cited

U.S. PATENT DOCUMENTS

| | | | |
|---|---|---|---|
| 9,736,791 B1 * | 8/2017 | Ameixieira | H04W 52/281 |
| 11,662,721 B2 * | 5/2023 | Bender | H04W 72/23 |
| | | | 701/117 |
| 2018/0092086 A1 * | 3/2018 | Nammi | H04L 27/26025 |
| 2019/0323855 A1 * | 10/2019 | Mahler | G01S 17/931 |
| 2020/0280827 A1 * | 9/2020 | Fechtel | H04W 8/08 |
| 2021/0356279 A1 * | 11/2021 | Szigeti | G01C 21/3407 |
| 2022/0021597 A1 * | 1/2022 | Cui | H04W 4/24 |

(Continued)

*Primary Examiner* — Adam D Tissot
(74) *Attorney, Agent, or Firm* — Studebaker Brackett PLLC

(57) ABSTRACT

The present disclosure relates a method and apparatus for determining a path of an autonomous driving vehicle considering a communication network load. The method may include: (a) a step of transmitting global path information of all paths from a start point to a destination of a vehicle and vehicle identification (ID) information to a control server; (b) a step of receiving arrival time estimation information of the vehicle at at least one node on the all paths and wireless resource use rate information of at least one vehicle including the vehicle at each of the at least one node from the control server; (c) a step of determining a final movement path of the vehicle of the all paths on the basis of the arrival time estimation information and the wireless resource use rate; and (c) a step of performing autonomous driving along the determined final movement path.

6 Claims, 5 Drawing Sheets

(56) References Cited

U.S. PATENT DOCUMENTS

2022/0196425 A1* 6/2022 Xu ..................... H04W 24/10
2022/0353732 A1* 11/2022 Filippou ........... H04W 28/0289
2023/0072769 A1* 3/2023 Yeh ................... H04W 28/0858

* cited by examiner

METHOD AND APPARATUS FOR DETERMINING A PATH OF AN AUTONOMOUS DRIVING VEHICLE CONSIDERING COMMUNICATION NETWORK LOAD

CROSS REFERENCE TO RELATED APPLICATION

The present application claims priority to Korean Patent Application No. 10-2022-0143009, filed 31, Oct. 2022, the entire contents of which is incorporated herein for all purposes by this reference.

BACKGROUND OF THE INVENTION

Field of the Invention

The present disclosure relates to a method and apparatus for determining a path of an autonomous driving vehicle, and in more detail, a method and apparatus for determining a path of an autonomous driving vehicle considering a communication network load.

Description of the Related Art

An autonomous system, for example, in a moving object that moves at a high speed such as a vehicle, receives in real time not only static information mainly about the geometric structures of roads for positioning and recognizing driving environments, but dynamic traffic situation information such as a moving state including positions of a vehicle and pedestrians, path plans of surrounding moving objects, the states of traffic lights, and traffic congestion through Vehicular to Everything (V2X) communication, and establish a global and local path plan by applying the information.

Further, an autonomous system performs platooning, cooperative maneuvering, cooperative sensing, and remote driving while exchanging information collected through sensors and a local path plan with surrounding moving object and infrastructures through V2X communication.

Accordingly, it is required to transmit/receive data of about maximum 100 Mbps per system through V2X communication in order to support stable and efficient driving by autonomous driving systems.

In particular, data capacity that should be provided to several autonomous systems when autonomous moving objects are concentrated such as an intersection considerably increases more than the data capacity in V2X communication that is required for common road situations.

Accordingly, there is a problem that it is very difficult in the next vehicle communication network by the 5G new ratio (NR) V2X communication technology to provide data capacity of V2X communication that is excessively required due to such denseness of moving objects.

PRIOR ART DOCUMENT (Patent Document) Korean Patent No. 10-1847712

SUMMARY OF THE INVENTION

The present disclosure has been made in an effort to solve the problems and an objective of the present disclosure is to provide a method and apparatus for determining a path of an autonomous moving object considering a communication network load.

Further, an objective of the present disclosure is to provide a method and apparatus for determining a final movement path of a vehicle of all paths on the basis of arrival time estimation information and wireless resource use rate information.

The objectives of the present disclosure are not limited to those described above and other objectives may be made apparent to those skilled in the art from claims.

In order to achieve the objectives, a method of determining an autonomous driving vehicle considering a communication network load according to an embodiment of the present disclosure may include: (a) a step of transmitting global path information of all paths from a start point to a destination of a vehicle and vehicle identification (ID) information to a control server; (b) a step of receiving arrival time estimation information of the vehicle at at least one node on the all paths and wireless resource use rate information of at least one vehicle including the vehicle at each of the at least one node from the control server; (c) a step of determining a final movement path of the vehicle of the all paths on the basis of the arrival time estimation information and the wireless resource use rate; and (c) a step of performing autonomous driving along the determined final movement path.

In an embodiment, the arrival time estimation information may be determined on the global path information and the vehicle ID information by the control server, and the wireless resource use rate information is determined on the basis of the arrival time estimation information by the control server.

In an embodiment, the wireless resource use information may be determined by the control server on the basis of the total amount of wireless resources available at each of the at least one node, the number of vehicles that perform communication according to autonomous driving at each of the at least one node, and the amount of wireless resources that are assigned to each of the at least one vehicle at each of the at least one node.

In an embodiment, the step (c) may include: a step of determining an existing movement path as a final movement path from the start point to the destination when the value of the wireless resource use rate information is smaller than a critical value; and a step of determining another movement path of the vehicle of the all paths as a final movement path from the start point to the destination on the basis of the arrival time estimation information and the wireless resource use rate information when the value of the wireless resource use rate information is larger than the critical value.

In an embodiment, the step (c) may include: a step of determining at least one available candidate path from a next root node from the position of the vehicle in accordance with a predetermined node depth when the value of the wireless use rate information is larger than the critical value; and a step of determining another moving path that minimizes the wireless resource use rate at at least one candidate node included in each of the at least one candidate path and the movement path of the at least one candidate path; and a step of determining the another movement path as the final movement path.

In an embodiment, an apparatus for determining a path of an autonomous driving vehicle considering a communication network load may include: a communication unit transmitting global path information of all paths from a start point to a destination of a vehicle and vehicle identification (ID) information to a control server, and receiving arrival time estimation information of the vehicle at at least one node on the all paths and wireless resource use rate information of at least one vehicle including the vehicle at each of the at least one node from the control server; and a control unit determining a final movement path of the vehicle of the all paths on the basis of the arrival time estimation information and the wireless resource use rate, and performing autonomous driving along the determined final movement path.

In an embodiment, the arrival time estimation information may be determined on the global path information and the vehicle ID information by the control server, and the wireless resource use rate information is determined on the basis of the arrival time estimation information by the control server.

In an embodiment, the wireless resource use information may be determined by the control server on the basis of the total amount of wireless resources available at each of the at least one node, the number of vehicles that perform communication according to autonomous driving at each of the at least one node, and the amount of wireless resources that are assigned to each of the at least one vehicle at each of the at least one node.

In an embodiment, the control unit may determine an existing movement path as a final movement path from the start point to the destination when the value of the wireless resource use rate information is smaller than a critical value, and may determine another movement path of the vehicle of the all paths as a final movement path from the start point to the destination on the basis of the arrival time estimation information and the wireless resource use rate information when the value of the wireless resource use rate information is larger than the critical value.

In an embodiment, the control unit may determine at least one available candidate path from a next root node from the position of the vehicle in accordance with a predetermined node depth when the value of the wireless use rate information is larger than the critical value, may determine another moving path that minimizes the wireless resource use rate at at least one candidate node included in each of the at least one candidate path and the movement path of the at least one candidate path, and may determine the another movement path as the final movement path.

Details for achieving the objectives would be made clear by referring to the following embodiments to be described with the accompanying drawings.

However, the present disclosure is not limited to the embodiments disclosed hereafter and may be configured in various other ways, which is provided to complete the present disclosure and completely inform those having common knowledge in the art (hereafter, "those skilled in the art") of the range of the present disclosure.

According to an embodiment of the present disclosure, it is possible to balance a vehicle communication network load in a distributed method by path control of individual vehicles rather than a control server by receiving estimation information about a resource assignment situation of a vehicle communication network on a path, to which an individual autonomous vehicle will move, from an infrastructure, and by controlling individual autonomous vehicles to independently plan and follow an autonomous path so that resources can be sufficiently assigned to the individual autonomous vehicle from a vehicle communication network.

Further, according to the present disclosure, an individual autonomous vehicle can receive estimation information about a resource assignment situation of a vehicle communication network from an autonomous control server, can be sufficiently provided with network resources of several available path using the estimation information, and can be controlled to select a path minimizing a movement distance and follow the selected path.

Further, according to the present disclosure, it is possible to select a path that can make a load of a vehicle communication network uniform in several paths, and control a vehicle to follow the selected path.

The effects of the present disclosure are not limited to the effects described above, and provisional effects that are expected from the technical features of the present disclosure would be clearly understood from the following description.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
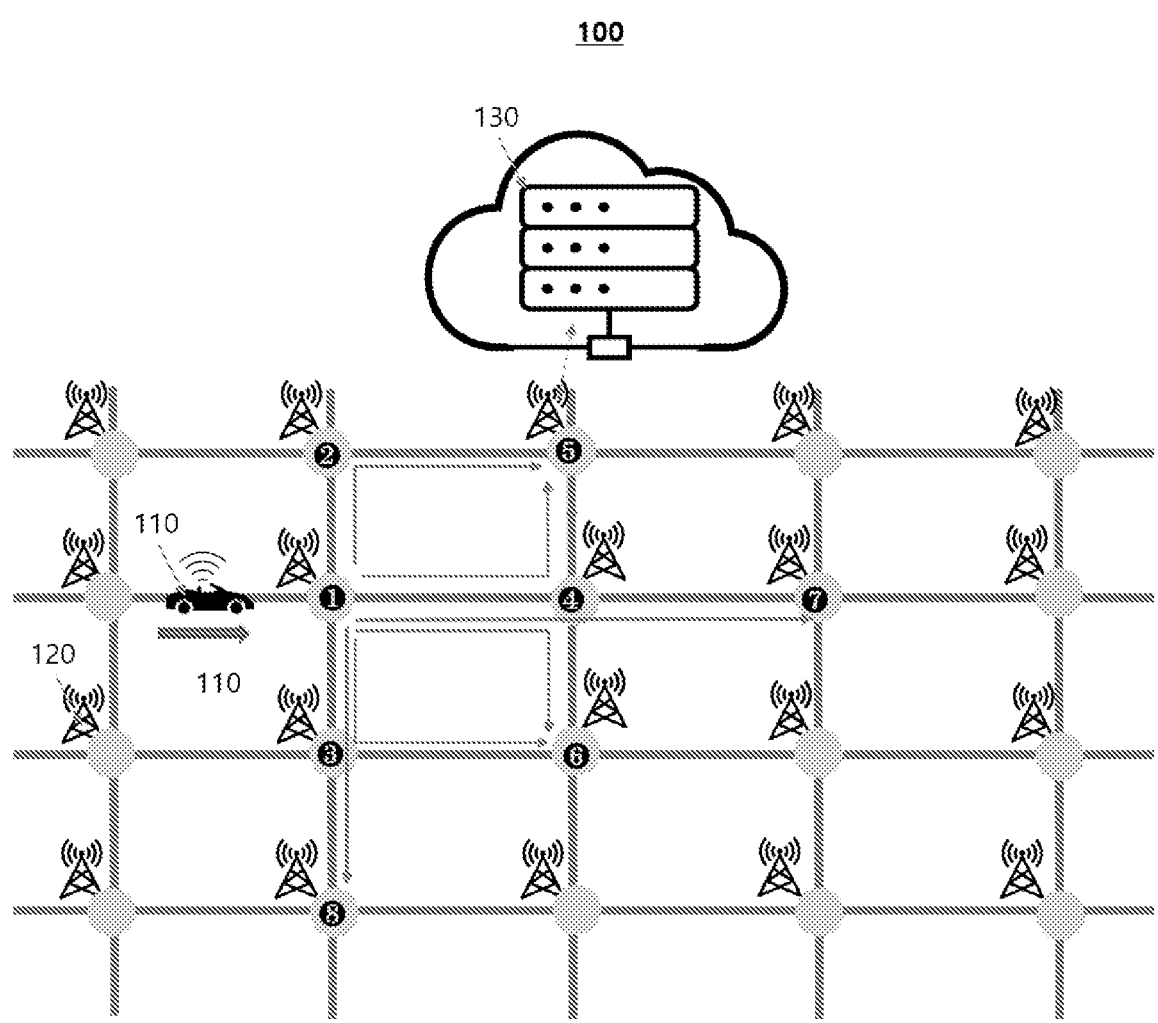
FIG. 1 is a view showing a system for determining a path of an autonomous moving object considering a communication network load according to an embodiment of the present disclosure.

The present disclosure may be modified in various ways and implemented by various exemplary embodiments, so that specific exemplary embodiments are shown in the drawings and will be described in detail.

Various features of the present disclosure disclosed in claims will be better understood in consideration of drawings and detailed description. An apparatus, a method, a manufacturing method, and various embodiments disclosed in the specification are provided for examples. The disclosed structure and functional features are provided for those skilled in the art to be able to implement various embodiments in detail rather than limiting the scope of the present disclosure. The disclosed terms and sentences are provided to easily explain the features of the present disclosure rather than limiting the scope of the present disclosure.

In describing the present invention, detailed descriptions of well-known technologies will be omitted so as not to obscure the description of the present invention with unnecessary detail Hereafter, a method and apparatus for determining a path of an autonomous moving object considering a communication network load according to an embodiment of the present disclosure.

FIG. 1 is a view showing a system 100 for determining a path of an autonomous moving object considering a communication network load according to an embodiment of the present disclosure.

Referring to FIG. 1, the system 100 for determining a path may include a vehicle 110, a roadside base station 120, and a control server 130. In an embodiment, the vehicle 110 may include an autonomous vehicle.

The vehicle 110 can transmit global path information for all paths from a start point to a destination to the roadside base station 120 together with identification (ID) information of the vehicle 110. In this case, the global path information may mean a path plan connecting all nodes (e.g., intersection points, junction and divergence points of roads, and points with sudden situations such as an accident and construction) on all paths.

A roadside base station 120 installed at each node can transmit the received vehicle ID information and global path information to the control server 130 together with a roadside base station ID.

The control server 130 may include a traffic controller 130-1 (not shown) and a vehicle communication network controller 130-2 (not shown).

In an embodiment, the traffic controller 130-1 and the vehicle communication network controller 130-2 may be included in a control unit, but the control unit may include at least one processor or microprocessor or may be a part of a process. Further, the control unit 420 may be referred to as a communication processor (CP). The control unit can control operation of the control server 130 according to various embodiments of the present disclosure.

In various embodiments of the present disclosure, the control server 130 does not necessarily include the components shown in FIG. 1, so it may include more or less components than those shown in FIG. 1.

The traffic controller 130-1 creates time schedule estimation information for all paths from a start point from a destination of the vehicle 110 using road network map-based traffic situation information on the basis of the received vehicle ID information and global path information. Accordingly, it is possible to estimate arrival times at all nodes on all paths.

The traffic controller 130-1 can create arrival time estimation information for nodes on a path as traffic monitoring messages and transmit the traffic monitoring messages to the vehicle 110 through the roadside base stations 120.

The traffic controller 130-1 can collect global path information of all vehicles in a control region, create arrival time estimation information for all nodes on the paths, and estimate all vehicles that will pass through a node k at a certain time t and a traffic volume by the vehicle on the basis of the information.

The vehicle communication network controller 130-2 estimates a V2X communication network load that will be generated at each node on a path by estimating a message generation amount by an autonomous service, which will be performed by each vehicle, at each nodes on the path on the basis of arrival time estimation information at all of the node on the global path of each vehicle created by the traffic controller 130-1. In this case, a V2X communication network may include a PC5 interface that performs Vehicle to Vehicle (V2), Vehicle to Infrastructure (V2I), and Vehicle to Pedestrian (V2P), and a Uu interface that performs a Vehicle to Network (V2N). Accordingly, wireless resource use rate information $U_k(t)$ of a V2X communication network that will be requested by all vehicle that will pass through a node k at a certain time t can be calculated as in <Equation 1>.

$$U_k(t) = \frac{1}{B} \sum_{v=1}^{V_k(t)} B_v(t) \quad \text{[Equation 1]}$$

where B is the total amount of wireless resources of a V2X wireless communication network that is available in the area of the node k, $V_k(t)$ is the number of vehicles that generate a data load while performing an autonomous service in the area of the node k, and $B_v(t)$ is the amount of wireless resources that will be assigned to vehicles v included in $V_k(t)$.

The vehicle communication network controller 130-2 can estimate a wireless resource use rate $\{U_k(t)\}_{k=1,\ldots,K, t=0,\ldots,NT}$ for times (t=0, T, 2T, . . . nT, . . . , NT) at which estimation is required at all the nodes (k=1, . . . , K) in the control region.

In this case, the wireless resource use rate $U_k(0)$ when t=0 shows the current wireless resource use rate in the area of the node k. The reason of limiting estimation of a wireless resource use rate to nodes on a path rather than all paths is because vehicles are stagnated and congested at nodes (e.g., intersection points, junction and divergence points of roads, and points with sudden situations such as an accident and construction) and various autonomous services are activated to solve this problem, so a data load is the most increased due to an increase of generation of messages.

The vehicle communication network controller 130-2 can create the created $\{U_k(t)\}_{k=1,\ldots,K, t=0,\ldots,NT}$ into a network monitoring message and can transmit the network monitoring message to the vehicle 110 through the roadside base station 120.

The vehicle 110 can receive a traffic monitoring message created by the traffic controller 130-1 and the network monitoring message created by the vehicle communication network controller 130-2 and can determine whether necessary network resources can be assigned to the vehicle 110, which will pass through all of the nodes on the path through which the vehicle 110 moves, at times at which the vehicle 110 arrives the nodes, respectively, using arrival time estimation information for each of the nodes on the path and wireless resource use rate information for the nodes on the path.

If a network resource assignment is possible for all of the node on a path, the vehicle 110 may maintain the existing path plan (that is, the existing movement path). For example, when the vehicle 110 arrives the area of the node k after the time t and when the wireless resource use rate information $U_k(t)$ at the node at the time is lower than a predetermined critical value $U_{threshold}$, that is, $U_k(t) < U_{threshold}$, the vehicle 110 can maintain the existing path plan.

However, if network resource assignment is impossible at even one of the nodes on the path, the vehicle 110 may make a new alternative path plan. For example, when the vehicle 110 arrives the area of the node k after the time t and when the wireless resource use rate $U_k(t)$ at the node at the time exceeds a predetermined critical value $U_{threshold}$, that is, $U_k(t) > U_{threshold}$, the vehicle 110 can make a new alternative path plan (that is, another movement path).

The node that the vehicle 110 next arrives may be determined as a root node, and the vehicle 100 can create all available candidate paths $\{p_i\}_{i=1,\ldots,I}$ in accordance with a node depth determined in advance in accordance with an algorithm.

For example, when a node depth is 3, a candidate path starting from a node ❶, which is a root node in FIG. 1, and further including two following nodes may be considered. Accordingly, six available candidate paths ❶-❷-❺, ❶-❹-❺, ❶-❹-❼, ❶-❹-❻, ❶-❸-❻, and ❶-❸-❽ can be created.

In this case, when a wireless resource use rate $U_k(t)$ exceeds a predetermined critical value $U_{threshold}$ at any one node included in the candidate paths, the vehicle 110 can exclude the path from the candidate paths.

The vehicle 110 can determine one path that minimizes the average value of wireless resource use rates of the nodes included in each individual path and that minimizes the distances of the individual paths from the all created available candidate paths.

In this case, a maximum value may be considered instead of the average value of wireless resource use rates and time may be considered instead of the distances of the paths. It is possible to change one selected path that minimizes a wireless resource use rate and a movement distance determined through this process as a new global path replacing the existing global path, that is, as a final movement path and it is possible to perform autonomous driving along the final movement path.

In an embodiment, the vehicle 110 can update the changed new global path by transmitting it to the control server 130.

Figure 2:
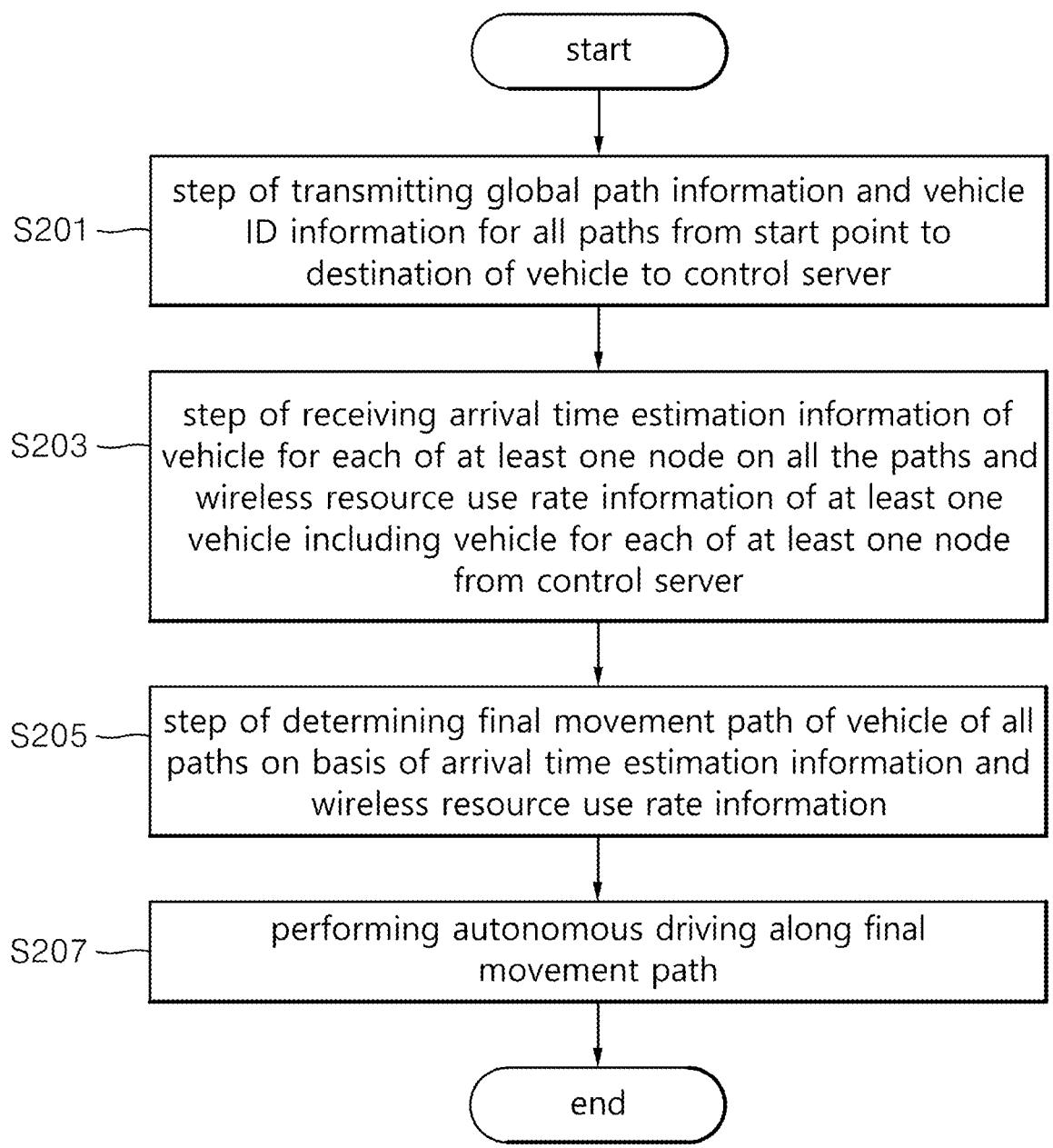
FIG. 2 is a view showing a method of determining a path of an autonomous moving object considering a communication network load according to an embodiment of the present disclosure.

FIG. 2 is a view showing a method of determining a path of an autonomous moving object considering a communication network load according to an embodiment of the present disclosure. In an embodiment, the steps shown in FIG. 2 may be performed by the apparatus 500 for determining a path shown in FIG. 5.

Referring to FIG. 2, step S201 is a step of transmitting global path information and vehicle identification (ID) information for all paths from a start point to a destination of the vehicle 110 to the control server 130.

Step S203 is a step of receiving arrival time estimation information of the vehicle for each of at least one node on all the paths and wireless resource use rate information of at least one vehicle including the vehicle 110 for each of at least one node from the control server 130.

In an embodiment, the arrival time estimation information may be determined on the basis of the global path information and the vehicle ID information by the control server 130 and the wireless resource use rate information may be determined on the basis of the arrival time estimation information by the control server 130.

In an embodiment, the wireless resource use information may be determined by the control server 130 on the basis of the total amount of wireless resources available at each of the at least one node, the number of vehicles that perform communication according to autonomous driving at each of the at least one node, and the amount of wireless resources that are assigned to each of the at least one vehicle at each of the at least one node.

Step S205 is a step of determining a final movement path of the vehicle 110 of all paths on the basis of the arrival time estimation information and the wireless resource use rate information.

Step S207 is a step of performing autonomous driving along the determined final movement path.

Figure 3:
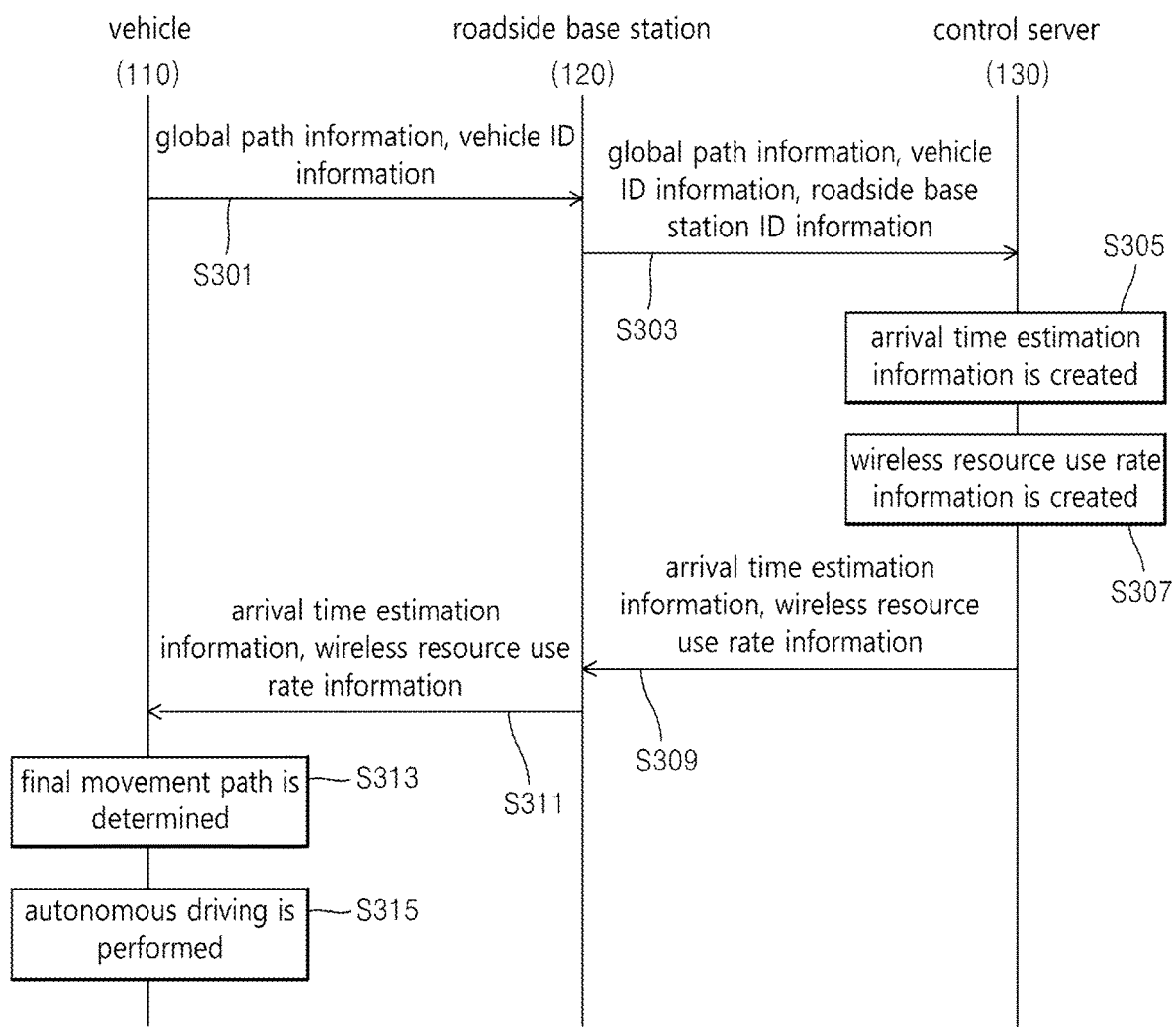
FIG. 3 is a view showing signal flow for determining a path of an autonomous moving object considering a communication network load according to an embodiment of the present disclosure.

FIG. 3 is a view showing signal flow for determining a path of an autonomous moving object considering a communication network load according to an embodiment of the present disclosure.

Referring to FIG. 3, in step S301, the vehicle 110 can transmit global path information for all paths from a start point to a destination of the vehicle 110 and vehicle ID information to the roadside base station 120.

In step S303, the roadside base station 120 can transmit the received global path information and vehicle ID information, and roadside base station ID information of the roadside base station 120 to the control server 130.

In step S305, the control server 130 can calculate arrival time estimation information on the basis of the global path information, the vehicle ID information, and the roadside base station ID information.

In step S307, the control server 130 can calculate wireless resource use rate information on the basis of the arrival time estimation information.

In step S309, the control server 130 can transmit the arrival time estimation information and the wireless resource use rate information to the roadside base station 120.

In step S311, the roadside base station 120 can transmit the arrival time estimation information and the wireless resource use rate information to the vehicle 110.

Step S313, the vehicle 110 determine a final movement path of the vehicle 110 of all paths on the basis of the arrival time estimation information and the wireless resource use rate information.

In step S315, the vehicle 110 can perform autonomous driving along the final movement path.

Figure 4:
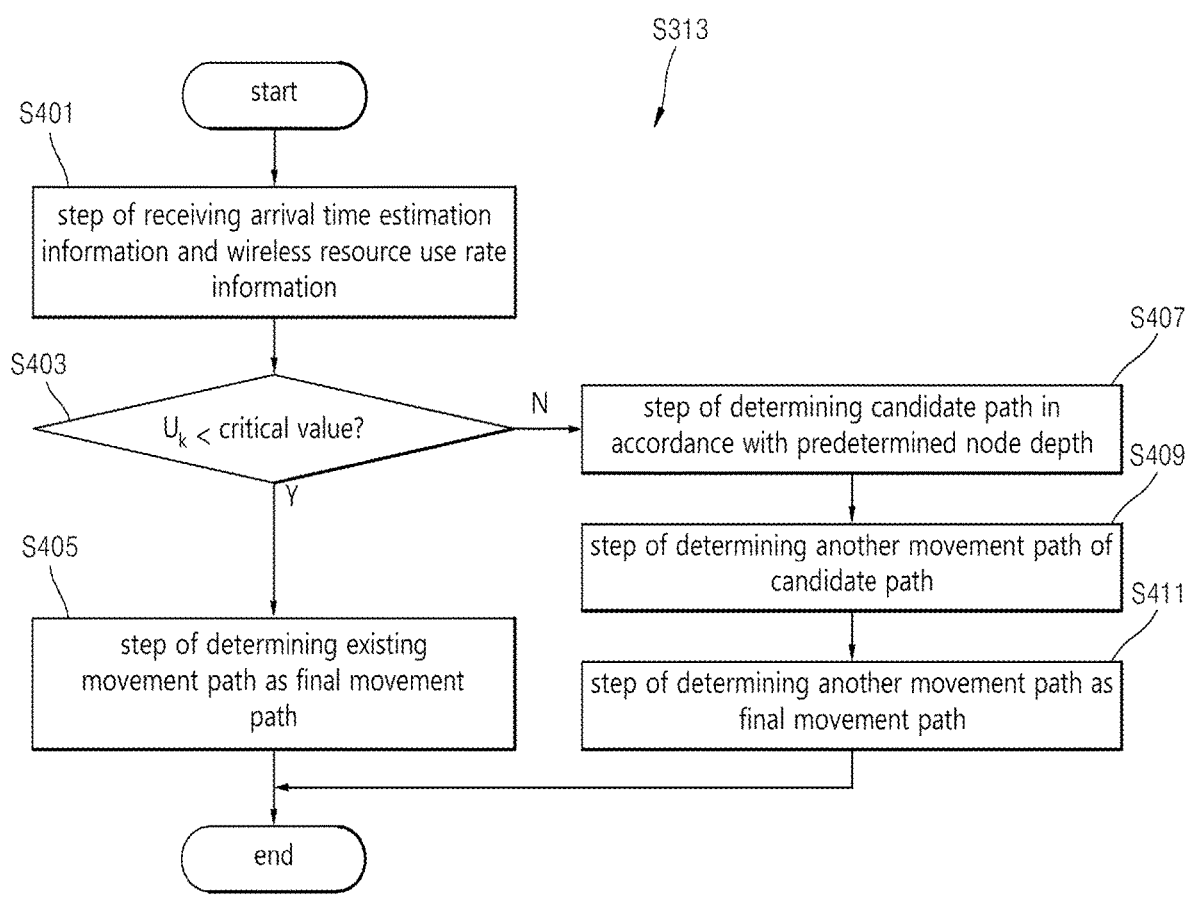
FIG. 4 is a view showing another example of a method of determining a path of an autonomous moving object considering a communication network load according to an embodiment of the present disclosure.

FIG. 4 is a view showing another example of a method of determining a path of an autonomous moving object considering a communication network load according to an embodiment of the present disclosure. In an embodiment, the steps shown in FIG. 4 may be performed by the apparatus 500 for determining a path shown in FIG. 5.

Referring to FIG. 4, step S401 is a step of receiving arrival time estimation information of the vehicle for at least one node on all paths and wireless resource use rate information of at least one vehicle including the vehicle 110 for each of at least one node from the control server 130.

Step S403 is a step of determining whether the value $U_k$ of the wireless resource use rate information is smaller than a critical value.

Step S405 is a step of determining the existing movement path as a final movement path from the start point to the destination when the value of the wireless resource use rate information is smaller than the critical value.

In an embodiment, when the value of the wireless resource use rate information is larger than the critical value, it is possible to determine another movement path of the vehicle 110 of all paths as a final movement path from the start point to the destination on the basis of the arrival time estimation information and the wireless resource use rate information.

Step S407 is a step of determining at least one available candidate path from a next root node from the position of the vehicle 110 in accordance with a predetermined node depth when the value of the wireless use rate information is larger than the critical value.

Step S409 is a step of determining another moving path that minimizes the wireless resource use rate at at least one candidate node included in each of the at least one candidate path and the movement path of at least one candidate path.

Step S411 is a step of determining another movement path as the final movement path.

Figure 5:
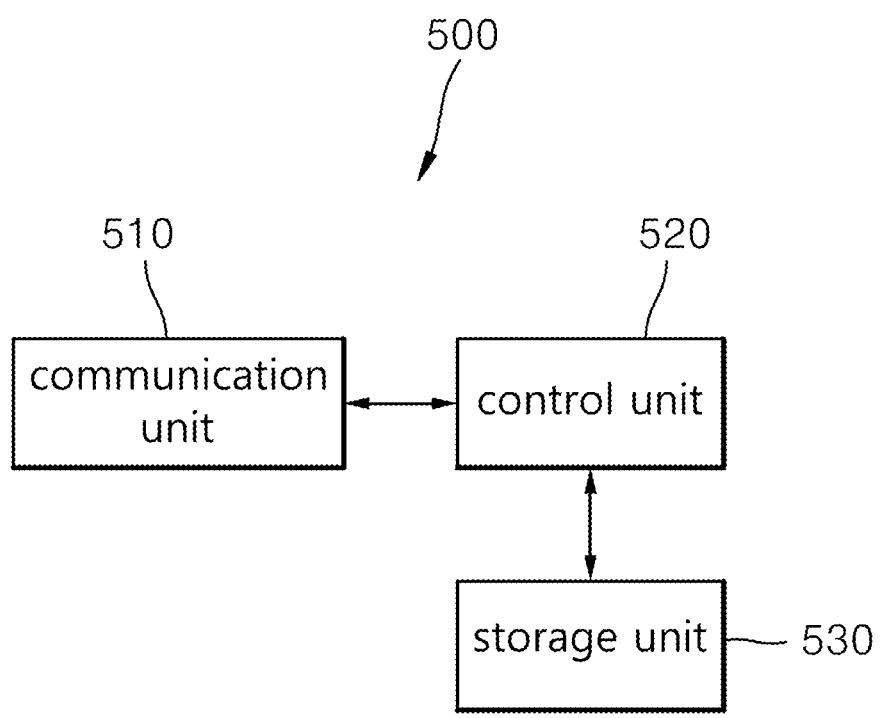
FIG. 5 is a view showing the functional configuration of an apparatus for determining a path of an autonomous moving object considering a communication network load according to an embodiment of the present disclosure.

FIG. 5 is a view showing the functional configuration of the apparatus 500 for determining a path of an autonomous moving object considering a communication network load according to an embodiment of the present disclosure. In an embodiment, the apparatus 500 for determining a path may include the vehicle 110 shown in FIG. 1.

Referring to FIG. 5, the apparatus 500 for determining a path may include a communication unit 510, a control unit 520, and a storage unit 530.

The communication unit 510 can transmit global path information of all path from a start point to a destination of the vehicle and vehicle identification (ID) information to the control server 130 and can receive arrival time estimation information of the vehicle 110 at at least one node and wireless resource use rate information of at least one vehicle including the vehicle 110 at each of at least one node.

In an embodiment, the communication unit 510 may include at least one of wired communication module and a wireless communication module. The communication unit 510 may be entirely or partially referred to as a 'transmitter', a 'receiver', or a 'transceiver'.

The control unit 520 can determine a final movement path of the vehicle of all paths on the basis of arrival time estimation information and wireless resource use rate information and can perform autonomous driving along the determined final movement path.

In an embodiment, the control unit 520 may include at least one processor or microprocessor, or may be a part of a processor. Further, the control unit 520 may be referred to as a Communication Processor (CP). The control unit 520 can control operation of the apparatus 500 for determining a path according to various embodiments of the present disclosure.

The storage unit 530 can store global path information, a final movement path, and vehicle identification (ID) information. In an embodiment, the storage unit 530 can store arrival time estimation information and wireless resource use rate information.

In an embodiment, the storage unit 530 may be a volatile memory, a nonvolatile memory, or a combination of a volatile memory and a nonvolatile memory. Further, the storage unit 530 can provide the kept data in response to a request from the control unit 520.

Referring to FIG. 5, the apparatus 500 for determining a path may include a communication unit 510, a control unit 520, and a storage unit 530. In various embodiments of the present disclosure, the apparatus 500 for determining a path does not necessarily include the components shown in FIG. 5, so it may include more or less components than those shown in FIG. 5.

The above description is only exemplary description of the spirit of the present disclosure and the present disclosure may be changed and modified by those skilled in the art in various ways without departing from the fundamental characteristics of the present disclosure.

Various embodiments disclosed in the specification may be performed regardless of order and may be simultaneously or separately performed.

In an embodiment, at least one step may be omitted or added in each figures described in the specification, may be performed in the reverse order, and may be simultaneously performed.

Accordingly, the embodiments described herein are provided merely not to limit, but to explain the spirit of the present disclosure, and the spirit of the present disclosure is not limited by the embodiments.

The protection range of the present disclosure should be construed on the basis of claims and all spirits that are considered as being same or equivalent to the protection range should be construed as being included in the right range of the

What is claimed is:

1. A method of determining an autonomous driving path with consideration of a communication network load, the method comprising:
transmitting, by a vehicle, global path information of all paths from a start point of the vehicle to a destination of the vehicle, and vehicle identification (ID) information, to a control server;
calculating, by the control server, wireless resource use rate information;
receiving, by the vehicle, arrival time estimation information of the vehicle at at least one node on the all paths and wireless resource use rate information of at least one vehicle including the vehicle at each of the at least one node, from the control server;
determining, by the vehicle, a final movement path of the vehicle of the all paths, based on the arrival time estimation information and the wireless resource use rate; and
performing, by the vehicle, autonomous driving along the determined final movement path,
wherein the wireless resource use rate information $U_k(t)$ of a Vehicular to Everything (V2X) communication network that will be requested by all vehicle that will pass through a node k at a certain time t is calculated as in Equation 1, $$U_k(t) = \frac{1}{B} \sum_{v=1}^{V_k(t)} B_v(t), \quad \text{[Equation 1]}$$

where B is a total amount of wireless resources of the V2X wireless communication network that is available in an area of the node k, $V_k(t)$ is a number of vehicles that generate a data load while performing an autonomous service in the area of the node k, and $B_v(t)$ is an amount of wireless resources that is assigned to vehicles v included in $V_k(t)$.

2. The method of claim 1, wherein the calculating comprises:
calculating the arrival time estimation information based on the global path information and the vehicle ID information.

3. The method of claim 1, wherein the determining the final movement path comprises:
determining another movement path of the vehicle of the all paths as the final movement path based on the arrival time estimation information and the wireless resource use rate information when a value of the wireless resource use rate information is larger than a critical value.

4. A system for determining a path of an autonomous driving vehicle considering a communication network load, the system comprising:
a vehicle comprising:
a communication unit configured to
transmit global path information of all paths from a start point of the vehicle to a destination of the vehicle, and vehicle identification (ID) information, to a control server, and
receive arrival time estimation information of the vehicle at at least one node on the all paths and wireless resource use rate information of at least one vehicle including the vehicle at each of the at least one node, from the control server; and a control unit configured to
determine a final movement path of the vehicle of the all paths based on the arrival time estimation information and the wireless resource use rate, and perform autonomous driving along the determined final movement path; and the control server configured to calculate the wireless resource use rate information, wherein the wireless resource use rate information $U_k(t)$ of a Vehicular to Everything (V2X) communication network that will be requested by all vehicle that will pass through a node k at a certain time t is calculated as in Equation 1, $$U_k(t) = \frac{1}{B} \sum_{v=1}^{V_k(t)} B_v(t),$$ [Equation 1]

where B is a total amount of wireless resources of the V2X wireless communication network that is available in an area of the node k, $V_k(t)$ is a number of vehicles that generate a data load while performing an autonomous service in the area of the node k, and $B_v(t)$ is an amount of wireless resources that is assigned to vehicles v included in $V_k(t)$.

5. The system of claim 4, wherein the control server is further configured to calculate the arrival time estimation information based on the global path information and the vehicle ID information.

6. The system of claim 4, wherein the control unit is further configured to:
determine another movement path of the vehicle of the all paths as the final movement path based the arrival time estimation information and the wireless resource use rate information when a value of the wireless resource use rate information is larger than a critical value.

* * * * *